United States Patent [19]

Findley et al.

[11] Patent Number: 4,569,034
[45] Date of Patent: Feb. 4, 1986

[54] METHOD AND APPARATUS WHICH ALLOWS THE WORKING STORAGE TO BE RECONFIGURED ACCORDING TO DEMANDS FOR PROCESSING DATA INPUT

[75] Inventors: Gerald I. Findley, Tucson, Ariz.; Wellington C. Yu, San Jose, Calif.

[73] Assignee: International Business Machines Corporation, Armonk, N.Y.

[21] Appl. No.: 399,642

[22] Filed: Jul. 19, 1982

[51] Int. Cl.[4] .............................................. G06F 7/00
[52] U.S. Cl. ................................................. 364/900
[58] Field of Search ... 364/200 MS File, 900 MS File

[56] References Cited

U.S. PATENT DOCUMENTS

| 3,725,868 | 4/1973 | Malmer, Jr. et al. | 364/200 |
| 3,771,142 | 11/1973 | Minshull et al. | 364/200 |
| 4,040,027 | 2/1977 | van Es et al. | 364/900 |
| 4,047,243 | 9/1977 | Dijkstra | 364/200 |
| 4,145,739 | 3/1979 | Dunning et al. | 364/200 |
| 4,298,954 | 11/1981 | Bigelow et al. | 364/900 |
| 4,467,411 | 8/1984 | Fry et al. | 364/200 |

OTHER PUBLICATIONS

J. L. Wescott, *Buffer Management in a Multitasking Environment*, IBM Tech. Disclosure, vol. 14, No. 5, Oct. 1971, p. 1404.
L. B. Baumer, *Read-Only Memory Controlled Buffering*, IBM Tech. Disclosure, vol. 15, No. 8, Jan. 1973, p. 2495.
M. E. Stump, *First In-First Out Space Management*, IBM Tech. Disclosure, vol. 16, No. 2, Jul. 1973, p. 658.
C. F. West and J. E. Deturk, *A Digital Computer for Scientific Applications*, Proceedings of the IRE, Dec. 1948, p. 1452.

*Primary Examiner*—Eddie P. Chan
*Assistant Examiner*—Daniel K. Dorsey
*Attorney, Agent, or Firm*—H. F. Somermeyer

[57] ABSTRACT

A working data store simultaneously serves as a FIFO buffer and operating memory. A portion of the FIFO buffer is reallocated for use as an operating memory as processing needs arise.

5 Claims, 4 Drawing Figures

METHOD AND APPARATUS WHICH ALLOWS THE WORKING STORAGE TO BE RECONFIGURED ACCORDING TO DEMANDS FOR PROCESSING DATA INPUT

DOCUMENT INCORPORATED BY REFERENCE

U.S. Pat. No. 4,031,519 shows a printer usable with the present invention.

FIELD OF THE INVENTION

The present invention relates to operational control of a data-storage unit used as a data buffer and as an operating memory.

BACKGROUND OF THE INVENTION

In data processing environments, buffering data has been a widely-used technique ever since the first data processors were constructed. For example, in an article by West, et al "A Digital Computer For A Scientific Application", *Proceedings of the IRE*, December 1948, pp. 1452-3, shows a buffering system of the alternating buffer type. A pair of buffer units are provided. While data is being read into a first buffer unit, data in a second buffer unit is being read out. These functions are alternated between the two buffer units such that an apparent wide-band flow of data goes through the buffer while using electronic circuits that operate at a speed slower than that would be required if the buffer units were not alternated.

A more common type of data buffering is the so-called first in, first out (FIFO) buffer characterized by a read-in counter and a read-out counter where the read-in counter indicates the memory address which is to next receive data while the read-out counter identifies the address of the register in the buffer containing data next to be read out. An example of such a buffer is shown in the IBM Technical Disclosure Bulletin, Vol. 15, No. 8, January 1973, in an article by L. B. Baumer, entitled "Read-Only Memory Controlled Buffering", on pp. 2495-6. Even with these types of buffering, the unit receiving the data must also provide buffering before the accumulated data can be processed; otherwise, data is processed by the receiver at the rate that the data is read out of the buffer.

One of the problems in a FIFO buffer is overrun and underrun such as set forth in U.S. Pat. No. 4,040,027, priority Netherlands, Apr. 25, 1975, as serial number 75/04901. This patent shows a FIFO buffer having a measuring device indicating the extent to which the buffer memory is filled or emptied. The measuring device then controls the data read in and data read out such that a predetermined filling of the buffer is maintained. U.S. Pat. No. 4,145,739, on the other hand, in column 16 and in FIGS. 17-19 shows a buffer control which does not output data until eleven bits have been inputted to the buffer. In other words, the buffer also serves as a data accumulator. U.S. Pat. No. 4,298,954 shows an alternating buffer system operating in a FIFO mode but which has a broader bandwidth in that alternation between the buffers is speeded up over that provided by earlier alternating buffers; that is, when a buffer is empty, alternation occurs even though the other buffer is not completely filled. In this manner, the alternation rate is determined by the buffer content as opposed to the slowest data rate, thereby enhancing data bandwidth.

Not only have electronic circuits been employed in controlling buffering data but also computer programs have been employed in buffering data, such as within the main memory of a processor. In such buffering, alternating buffering techniques have been used for inputting and outputting data from and to peripheral devices attached to the processor. In such a situation, a portion of main memory is allocated for the buffering function, and the programming controls the buffering operations. In newer computers, a programmed channel processor provides the buffering control. The techniques and logic employed in controlling such program-controlled buffering follows that of the earlier described hardware or electronic circuit controlled buffers. When this logic of control is employed in a programmed processor, the program controls for the buffer and the processing are logically independent, i.e., the buffer program control merely replaces electronic circuit controls. An example of such a control is shown in the IBM Technical Disclosure Bulletin, October 1971, Vol. 14, No. 5, in an article by J. L. Wescott, entitled "Buffer Management in a Multitasking Environment", on pp. 1404-1407. On page 1406, it is stated that the processor task receives full input buffers, i.e., the buffering within main memory occurs as if the buffering portion of the main memory were controlled as described for the electronic-circuit controlled buffers. A similar situation is disclosed in the IBM Technical Disclosure Bulletin, July 1973, Vol. 16, No. 2, pp. 658-661, in an article by M. E. Stump, entitled "First In-First Out Space Management". Again the logic of control separates the buffer management function from the data processing functions. As data rates increase, such separation tends to slow down the total data processing function within a programmed environment. Accordingly, it is desired to provide buffering controls that do not slow down the processing of data, allow a maximal overlap of processing and buffering functions and is achieved in a relatively simple manner.

SUMMARY OF THE INVENTION

In accordance with the invention, a working data store has a portion allocated for buffering data. The transfer of data into the buffer area is at a first rate by either an automatic data transfer system (electronic circuits) or an input programmed processor. The input data is stored into the allocated buffer area at locations having sequential storage addresses. A programmed processor operatively connected with the working store, and having a processing task requiring the utilization of the data being buffered, examines the input address to determine the extent that the input data has been stored into the buffer area. The using programmed processor memorizes the last memory addressed location receiving input data and then proceeds to execute its processing task using such stored input data at a second rate. The first rate may be greater than, equal to or less than the second rate. Simultaneously therewith, the input data continues to flow into the buffer area such that data is being buffered at the same time that other stored data is being processed to yield wider band input data buffering. Such simultaneity of operation is advantageous where the using programmed processor is dedicated to the processing task and would remain idle unless it could process input-buffered data. Upon completing processing the stored input data up to the first-examined memory address, the using programmed processor again examines the location address of the last inputted data. It memorizes this location address and then proceeds with the processing task for processing the later inputted data. These cycles are repeated until all of the input data has been processed.

In a specific form of the invention, input data buffering is for buffering text indicating data for use in a high-speed printer where the using programmed processor performs certain text processing tasks preparatory to document presentation by printing operations.

The foregoing and other objects, features, and advantages of the invention will be apparent from the following more particular description of preferred embodiments of the invention, as illustrated in the accompanying drawings.

DESCRIPTION OF THE DRAWINGS

Referring now more particularly to the drawing, like numerals indicate like parts and structural features in the various diagrams.

DETAILED DESCRIPTION

Figure 1:
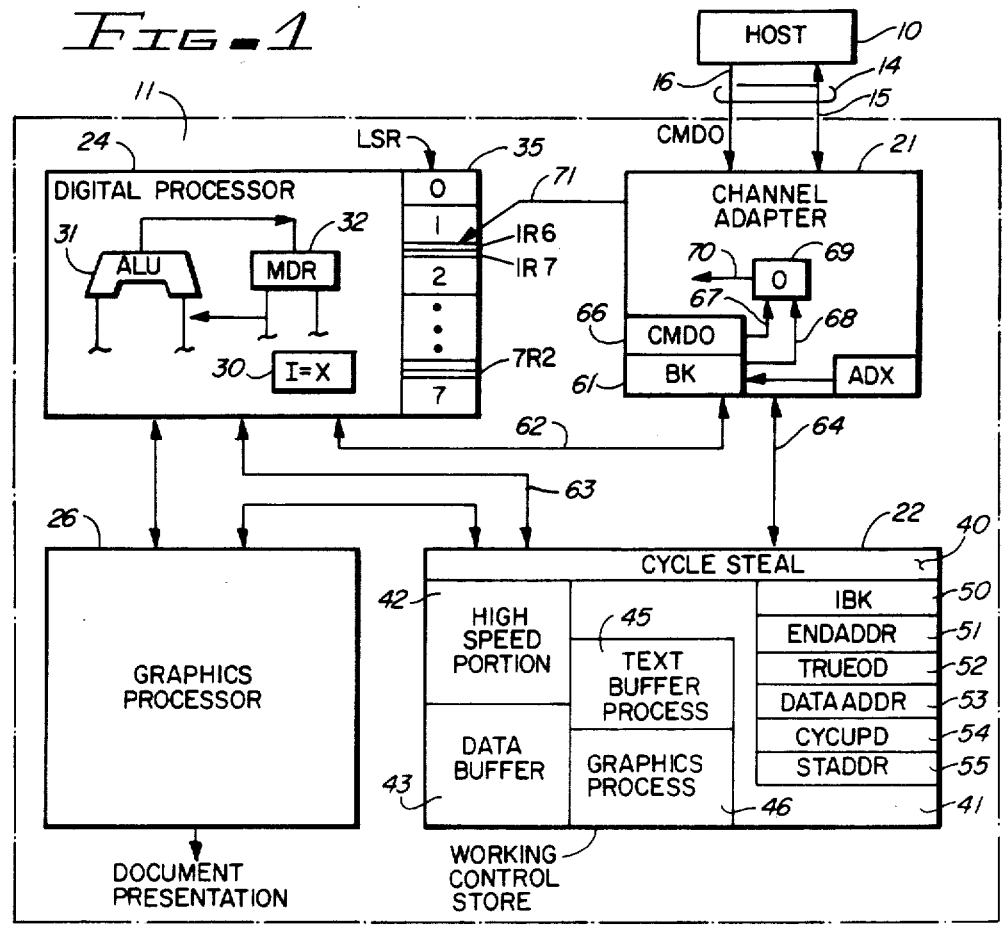
FIG. 1 is a block diagram of a data processing system employing the present invention in a document presentation or printer environment.

Host 10 is operatively coupled to an all-points-addressable printer 11 via input/output connection 14. In this regard, referring to U.S. Pat. No. 4,031,519 ('519), host 10 of the present application corresponds to data processing unit 16 of patent '519; main channel 14 of patent '519 is the same as the input/output connection 14 of the present application. Printer 11 corresponds to the showing in FIG. 2 of patent '519. The operation of host 10 with respect to printer 11 through input/output connection 14 is in accordance with known input/output connections. Generally, tag or control signals along with data signals are bidirectionally transferred over data buses extending between host 10 and printer 11 and as represented by double-headed arrow 15. Of particular interest for understanding the present invention is a separate tag signal, indicated by arrow 16, called COMMAND OUT and abbreviated CMDO in the drawings. This tag or control signal indicates to printer 11 that an operation is to be started; a series of peripheral or input/output commands for the operation follow. During the execution of such commands, a CMDO indicates termination of the data transfer operation. This latter function is used in connection with buffer control.

Figure 2:
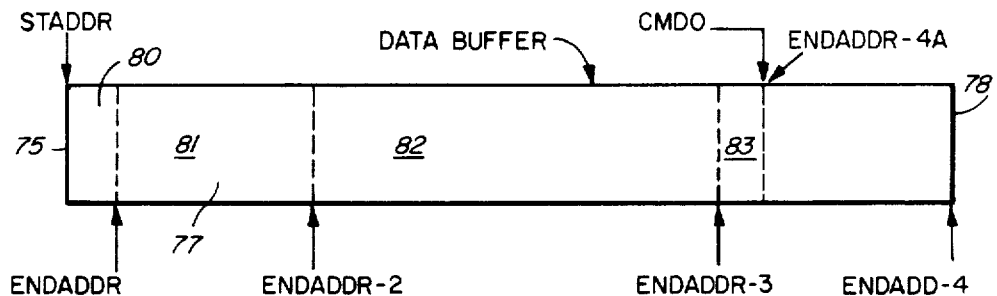
FIG. 2 diagramatically illustrates the operation of a data buffer in the FIG. 1 illustrated data processing system.

Printer 11 includes channel adapter 21 which corresponds to channel attachment circuits 21 of FIG. 2 of patent '519. Working control store 22, a semiconductive type of random access data storage unit, corresponds to writable control storage 40 of FIG. 3 of patent '519. Digital processor 24 corresponds to instruction execution unit 24 of FIG. 2 in patent '519. In the present description, writable control store 22 is broken out from the digital processor for more clearly illustrating the operation of the buffer with respect to the later described processing task or program. A graphics processor 26 of the present application corresponds in FIG. 2 of patent '519 to elements 26-29 inclusive. Graphics processor 26 receives text-indicating and control signals for operating a printing element for presenting a document represented by the received text signals. Such graphics processor is detailed in FIG. 6 of patent '519.

Digital processor 24 operates on an interrupt level basis. It maintains an indication in register 30 of its current interrupt level. As shown, levels 0 through 7 are employed; level 0 being the highest priority level. For understanding the present invention, only levels 1 and 7 need be discussed. Level 1 relates to those programs executed by digital processor 24 relating to operation of channel adapter 21 and other operations concerned directly with host I/O. Level 7 relates to all functions not having a higher priority. Digital processor 24 includes an arithmetic logic unit (ALU) 31 corresponding to the ALUs 32 and 44 shown in FIG. 3 of '519. ALU 31 has an accumulator register termed the main data register MDR 32 which corresponds favorably to the main data registers 50 and 52 of patent '519 in its FIG. 3. All program execution within digital processor 24 employs ALU 31 and MDR 32 in both arithmetic and logical operations for effecting the machine operations shown in FIG. 3 and 4.

Digital processor 24 includes its own internal storage registers termed local storage registers LSR 35, which correspond to register 34 of patent '519. LSR 35 is divided into eight groups of registers. Each group of registers corresponds to an interrupt level. The arrangement is such that the groups of registers store data corresponding to the current program being executed in that respective interrupt level. Accordingly, for preserving system integrity, digital processor 24 can only access a group of registers when it is currently operating within a given interrupt level. For example, interrupt level 1 can access the registers corresponding to that interrupt level and indicated in FIG. 1 by the numeral 1 in LSR 35. Of interest to the present description are the LSR interrupt level 1 register 1R6. In the LSR group of registers corresponding to interrupt level 7, only register 7R2 is of interest.

Working control store 22 is accessed by either channel adapter 21, digital processor 24, or graphics processor 26 through the usual cycle steal control 40. Working control store 22 includes a large plurality of addressable registers 41 which are addressable as in any usual random access memory. Within the addressable registers 41 are a plurality of high speed registers indicated by high speed portion 42 which is used for enhancing processing speed of digital processor 24. A data buffer 43 buffers data between channel adapter 21, processor 24, or use by graphics processor 26. It is within data buffer 43 that the present invention is advantageously employed, as will be described. Working control store 22 also includes storage of computer program indicia (such as electrical signals stored in a ROM or RAM) used by digital processor 24 for managing and operating printer 11. Such program indicia represent the processing task, such as the text buffer process 45 which controls those machine operations for managing data buffer 43 in accordance with the present invention. Also, graphics process 46 contains those program indicia enabling digital processor 24 to operate graphics processor 26 and constitutes the processing task of digital processor 24 which uses the input data stored within data buffer 43; that is, digital processor 24 employs that portion of data buffer 43 which stores input data as a working store even while the remainder of the data buffer is receiving data through channel adapter 21 and is serving as a FIFO (first in first out) data buffer.

Working control store 22 also stores the data structures used by digital processor 24 in operating printer 11. Of course, some of these data structures may be duplicated in LSR 35 which also contains data structures necessary for the internal operation of digital processor 24. In store 22, IBK 50 stores the initial byte count for the text data to be loaded into data buffer 43 in a given cycle of buffer operations. ENDADDR 51 stores the address within data buffer 43 against which digital processor 24 can execute processing task 46. TRUEOD 52 is a single flat bit indicating that the last byte of text data has been loaded into data buffer 43 by channel adapter 21. In other words, either the initial byte count stored in IBK 50 has been reached by the data transfer or host 10 has supplied a CMDO signal to channel adapter 21. DATAADDR 53 is the address within data buffer 43 which is to receive the next byte of data transmitted by channel adapter 21. CYCUPD 54 is a single flag bit indicating to digital processor 24 that the reason it is in level 1 interrupt operations is to update ENDADDR 51 based upon the contents of 1R6 of LSR 35. STADDR 55 stores the start address of the data buffer 43 portion of working control store 22. With this arrangement, all other data buffer 43 addresses can be offset addresses from the start address STADDR thereby simplifying data buffer 43 operations, as is well known.

Figure 4:
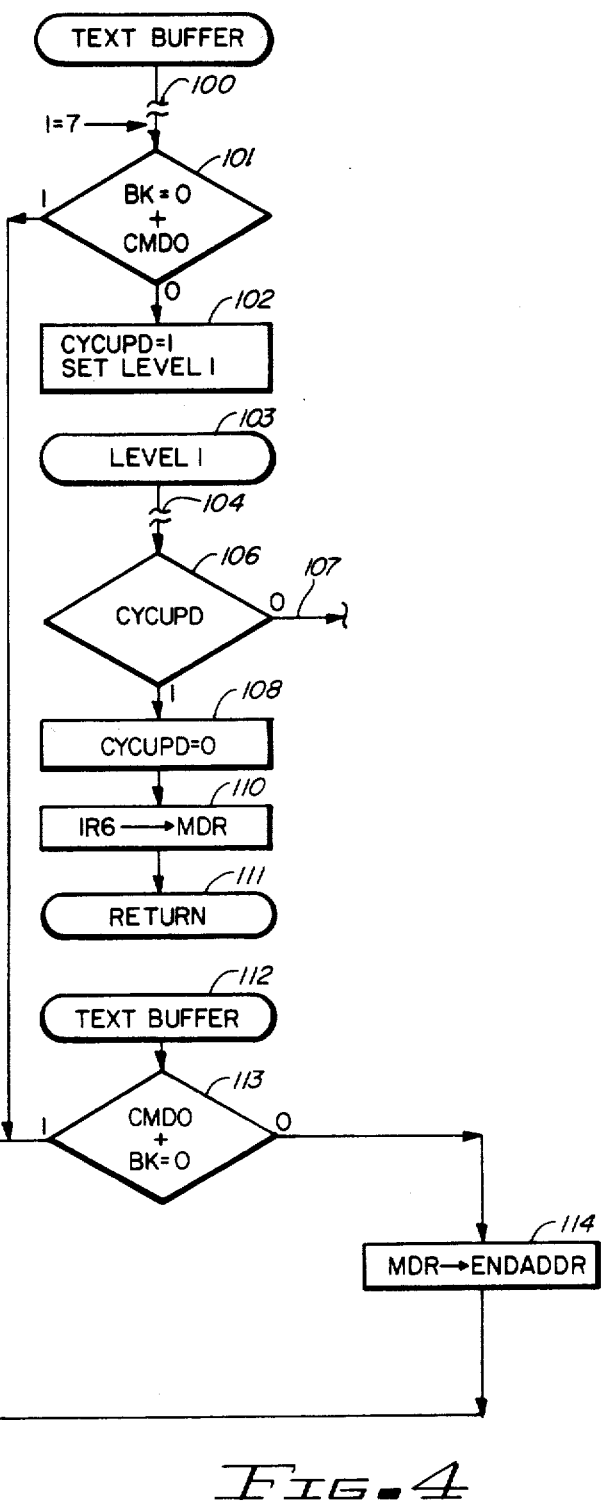
FIG. 4 is a second machine operations chart illustrating operations of the FIG. 1 illustrated system employed for setting buffer addresses for subsequent processing by a processing task of the FIG. 3 set of machine operations.

Channel adapter 21 includes all those electronic circuits well known for handling data transfers and controls between host 10 and printer 11. Of interest to the present invention is the automatic data transfer control ADX 60 constructed using known techniques for transferring data automatically between working control store 22 and channel adapter 21. Each time a byte of data is transferred from channel adapter 21, ADX 60 decrements byte counter BK 61. When BK 61 is zero, the data transfer is complete. When host 10 has indicated by a peripheral or input-output command to channel adapter 21 that text data is to be loaded into printer 11, digital processor 24 is activated by a signal supplied over line 62 to transfer the contents of IBK 50 from working control store 22 into BK 61. This is achieved by digital processor 24 supplying a suitable command over bus 63 for causing cycle steal 22 to access IBK 50 for transferring the contents of IBK 50 over bus 64 to channel adapter 21 for storage in BK 61 in a usual manner. When channel adapter 21 has activated ADX 60 to transfer data and then receives CMDO over line 16, it stores same in bit register 66. When bit register 66 stores the CMDO signal or when BK 61 has counted to zero, an end-of-transfer indicating signal is sent respectively over lines 67 or 68 to OR circuit 69. OR circuit 69 supplies the combined signal to line 70 for sensing by digital processor 24. As shown in FIG. 4, processor 24 senses line 70 for determining the end of transfer. Processor 24 addresses line 70 as a bit position of an external register, a known addressing operation.

Channel adapter 21 has a programmed control (not shown) of usual design that supervises and sequences the channel adapter functions usually employed in connecting a peripheral device to an IBM 370 host processor. This control has addressing capability, as indicated by arrow 71, to access the LSR 35 register in interrupt level 1. Since the processor 24 circuits also access these registers (1R0-1R7), they contain known access-attempt-tie-breaking circuits. During data transfers, channel adapter 21 maintains in register 1R6 the address of buffer area 43 that last received a byte of data (current data address).

Having described the portions of printer 11 that are pertinent to an understanding of the present invention, the logical operation of data buffer 43 as controlled by the above-described system and as implemented through the later-described machine operations is shown in FIG. 2, a diagramatic representation of the address space of data buffer 43. The start address STADDR stored in register 55 is represented by vertical line 75. The rectangular box 77 represents all of the addressable data storage registers within data buffer 43. The last address within data buffer area 43 within working control store 22 is represented by vertical line 78. Assume that host 10 has started sending text data to channel adapter 21. Channel adapter 21 responds to each received byte of data to store same in data buffer 43 beginning at STADDR. Successively received bytes are stored at respective successively addressed data storage locations. Digital processor 24, after initiating the data transfer operation by loading BK 61, performs some preliminary operations not pertinent to an understanding of the present invention preparatory to set up of the processing task 46. Upon completion of this preliminary work, digital processor 24 then fetches the current data address stored in LSR 35 register 1R6 by channel adapter 21. Digital processor 24 then stores the contents of 1R6 into ENDADDR 51 as represented in FIG. 2 by ENDADDR-1. At this time, digital processor 24 can execute the graphics processing task 46 for all of the stored input data beginning at STADDR 75 and ending at ENDADDR-1. Data buffer area 43 is still acting as a FIFO data buffer beginning at ENDADDR-1, while digital processor 24 accesses data buffer area 43 in portion 80 as a random access memory, i.e., not treated as a data buffer. While digital processor 24 is processing the data in portion 80, channel adapter 21 is continuing to store data in the data buffer area 43 in portion 81. Because digital processor 24 processing task 46 is time consuming, it processes the stored data at a much slower rate than host 10 is supplying data through channel adapter 21. Accordingly, when digital processor 24 has completed its processing of the data stored in portion 80, channel adapter 21 is already stored data up through ENDADDR-2. At this time, digital processor 24 again reads 1R6 and stores that address in ENDADDR 51. Digital processor 24 then proceeds to process the data in area 81 while channel adapter 21 continues to store data in the data buffer area 43 within portion 82. The cycle repeats as described for generating ENDADDR-3 and finally, ENDADDR-4, which corresponds to the end of data buffer area 43 at line 78. In this instance, the termination of the data transfer and digital processor 24 setting TRUEOD 52 to 1 is activated by BK 61 of channel adapter 21 supplying an active signal over line 68 through OR circuit 69 to interrupt digital processor 24. It is not necessary for host 10 to completely fill data buffer area 43 each time text is sent to printer 11. Accordingly, a CMDO signal on line 16 can be received as indicated by ENDADDR-4A. Accordingly when digital processor 24 has processed all of the input data of data buffer area 43 though ENDADDR-3, it then accesses the data stored in area 83 for completing the processing task.

From all of the above, it is seen that data buffer area 43 is used simultaneously for two purposes. The first use is a FIFO buffer for transferring text data from host 10 to graphics processor 26, as modified through processor task graphics process 46. While the data buffer area 43 is receiving text data from host 10, as a second simultaneous or parallel use, digital processor 24 performs a text processing task on the data that has already been stored thereby maximizing throughput (bandwidth) of the printer 11 thereby substantially increasing its document presentation rate over and above the data rate available by having a separately controlled data buffer area 43.

Figure 3:
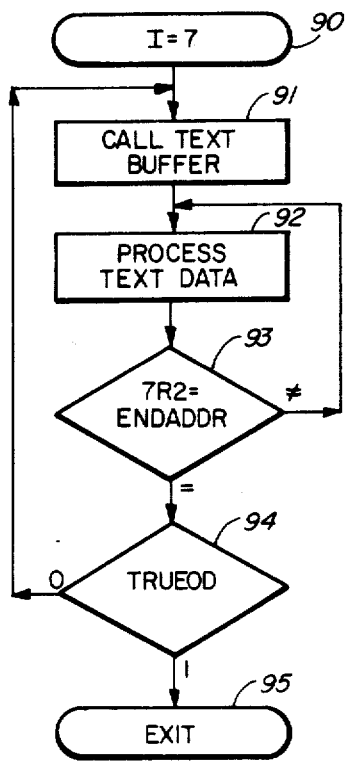
FIG. 3 is a machine operations chart showing the machine operations conducted by the programmed digital processor of FIG. 1, in executing a processor task based upon buffered data.

FIG. 3 shows the machine operations effected through digital processor 24 for implementing the present invention in the FIG. 1 illustrated system. Upon completion of initiating the data transfer from host 10 to data buffer 43, digital processor 24 examines all of its interrupt levels. Depending upon any outstanding tasks to be done, processor 24 will fairly soon reach interrupt level 7. Upon entering interrupt level 7, as at step 90, digital processor 24 at step 91 calls a text buffer program of FIG. 4 to see if any buffered text is available for task processing. Assume that the called text buffer program finds input text data to be processed; then at step 92 digital processor 24 invokes graphics process 46 for processing the stored text data in area 80 of FIG. 2. The process is such that one byte of text data is examined at a time. Groups of text data also could be processed at a time. It is to be appreciated that this text processing for each text byte may involve various types of program and machine operations which are not pertinent to an understanding of the present invention and which are well known in the printer art. Upon each complete or partial step, digital processor 24 at step 93 determines whether or not the byte that was just processed indicated by the address in LSR 35 register 7R2 was received from a data buffer area 43 address corresponding to the address stored ENDADDR 51. ENDADDR 51 was previously loaded by the text buffer program as later described with respect to FIG. 4. If the current address of the data buffer area 43 is less than ENDADDR 51, the next byte of text data is processed at step 92. As soon as digital processor 24 in a step 93 determines that the address of 7R2 equals ENDADDR 51, it stops the text processing for determining how much more data can be processed from data buffer area 43. At 94 digital processor 24 examines TRUEOD 52 to determine whether or not all of the data has been loaded into the data buffer area 43. If not (TRUEOD=0), the FIG. 4 illustrated text buffer program is called at 91 and the process repeated. When TRUEOD=1 is found at step 94, all of the text processing has been completed and digital processor 24 leaves the program at step 95 for effecting other printer machine operations not pertinent to an understanding of the present invention.

FIG. 4 illustrates the text buffer machine operations which are executed by digital processor 24 in the seventh interrupt level. Various miscellaneous functions are first performed at step 100 and which are not pertinent to an understanding of the present invention. At step 101 digital processor 24 accesses channel adapter 21 to examine BK 61 and CMDO 66. This action corresponds to the operation represented by OR circuit 69 in line 70 of FIG. 1. If neither BK 61 equals zero or COMMAND OUT is not set, then at step 102 level 1 interrupt level programming is activated for transferring the contents of 1R6 to ENDADDR 51. This action is achieved by setting CYCUPD 54 to unity to inform the level 1 interrupt programming that the just-described function is to be performed and the level 1 interrupt is set. This action corresponds to line 70 of FIG. 1.

The level 1 interrupt is entered at step 103 with miscellaneous level 1 interrupt processing occurring at step 104. For example, level 1 interrupt programming may be activated for any one of a plurality of reasons which may take priority over processing a level 1 interrupt CYCUPD. If no higher priority task called the level 1 interrupt programming, then at step 106 the bit CYCUPD 54 is examined. If it is a zero, then digital processor follows logic path 107 to perform other level 1 interrupt program functions not pertinent to the present disclosure. Otherwise, at step 108 digital processor 24 resets CYCUPD to zero. This action ensures that subsequent activation of the level 1 interrupt will not cause the updating functions to be performed. At step 110, digital processor 24 accesses LSR 35 register 1R6 and transfers the contents thereof to MDR 32. At this point in time, the contents of 1R6 residing in MDR 32 makes those byte count contents available to level 7 programming. At step 111 digital processor 24 returns to the text buffer program as indicated at step 112. The return is at an address within text buffer process 45 that step 113 again examines CMDO and BK. Since the processing of channel adapter 21 is asynchronous to program execution of digital processor 24, either one of these events could have occurred during the level 1 and text buffer processing. If the true end of data has not been reached, the at step 114 the byte count contents of MDR 32 are transferred to ENDADDR 51. At this point in time, digital processor 24 executes its graphics process 46 for all stored data in data buffer area 46 up through the new address in ENDADDR 51. On the other hand, if true end of data has occurred, then digital processor 24 wants to determine the amount of data residing in data buffer 43. This is achieved at step 116 by accessing IBK 50 and transferring it to a processor 24 internal register (not shown) as an input to ALU 31. The contents of BK 61 are also transferred to an input register of ALU 31. Then, digital processor 24 activates ALU 31 to subtract the contents of BK 61 from IBK resulting in DK (remaining data count) being stored in MDR 32. DK represents the number of addressable data storage registers in data buffer area 43 that have received and stored input data during the present buffer cycle, i.e., it indicates the data storage registers of FIG. 2 lying between STADDR 75 and ENDADDR-4A when a CMDO has been received or between vertical lines 75 and 78 when the byte count in BK 61 gas gone to zero. At step 117, digital processor 24 calculates the new ENDADDR by adding DK to STADDR. If data buffer area 43 had been completely filled to vertical line 78, then the new end address is ENDADDR-4 (DK=0). If a CMDO had been received, then BK could be non-zero since the number of bytes transferred subtract from IBK to yield a value in BK 61 of unfilled data storage registers. Accordingly, the non-zero value of BK results in a smaller DK value such that the sum of STADDR and DK yield ENDADDR-4A. At 118, TRUEOD 52 is set to unity priming the exit of digital processor 24 from the FIG. 3 illustrated machine operations via step 94. At 119 other miscellaneous machine operations are performed before digital processor 24 returns at step 120 to reexecute step 92 of FIG. 3, as heretofore described.

In an alternate and somewhat preferred embodiment, digital processor 24 accesses BK 61 in the level 7 program for calculating the next address to be stored in ENDADDR 51. This arrangement, easily designed by one of ordinary skill, avoids using the level 1 program. It does require interlocking BK 61 with the ADX 60 decrementing; such is easily achieved by using a known double-rank decrementing counter.

Returning to step 113, if CMDO was not received or BK≠0 (not end of data), then processor 24 at step 114 loads MSR 32 contents into ENDADDR 51 such that the latest contents of 1R6 are the new ENDADDR. Digital processor 24 returns at step 120 to continue text processing as at ENDADDR-1, -2, or -3 of FIG. 2.

Returning now to step 101 of FIG. 4, if at beginning of execution of the text buffer process, digital processor 24 at step 101 found that all of the data to be printed in this buffer cycle has been stored in data buffer area 43, it avoids transferring the contents of 1R6 to working control store 22. Rather it goes directly to the end processing steps 116-118 for identifying the last group of data bytes to be transferred from data buffer area 43 to graphics processor 26.

While the invention has been particularly shown and described with reference to preferred embodiments thereof, it will be understood by those skilled in the art that various changes in form and details may be made therein without departing from the spirit and scope of the invention.

What is claimed is:

1. A data processing system having a data buffer with a plurality of sequentially addressable data storage registers and being coupled to and addressable by a programmed digital processor for performing data processing tasks;

the improvement comprising:
a plurality of addressable control registers connected to said programmed digital processor for storing control and address signals, first means for transferring input data signals into said data buffer in successive ones of said sequentially addressable data storage registers and maintaining in a one of said control registers an electrical address indication of a one of said addressable data storage registers receiving a last one of said input data signals being stored and having means for updating said stored last address indication as additional data signals are stored into said data buffer;

said control registers including an end address register;

buffer program means in said digital processor for enabling said digital processor to access said stored last address indication and to transfer the stored last address indication from said one control register to said end address register as an end address for a data processing task;

processing program means in said digital processor for enabling the digital processing to execute said data processing task on all data signals stored in said data buffer addressable data storage registers through said end address indicated in said end address register concurrently while additional data signals are being stored in said data buffer in said data storage registers having addresses successively following the address signified by said stored last address indication; and repeater means in the digital processor connected to said first means for being responsive to said first means storing said additional data signals in said data buffer for repeating execution of said buffer and processing program means by said digital processor as said digital processor completes said processing task on the data signals in said data buffer up through said end-address-indicated data storage register until no additional data signals are stored in said data buffer.

2. The data processing system set forth in claim 1, wherein said first means includes a channel adapter attachable to a host processor for receiving data signals to be processed by said digital processor; and
a peripheral equipment attached to said channel adapter and said digital processor for performing predetermined peripheral data processing functions with respect to data signals stored in said data buffer.

3. The data processing system set forth in claim 2, wherein said peripheral equipment is a graphics processor for presenting documents and said stored data signals represent text data; and
means in said channel adapter connected to said first means for terminating storage of data signals in said data buffer whenever a predetermined number of bytes of data signals have been unloaded into said data buffer whenever said channel adapter supplies an indication that the storage of data signals in said data buffer has been completed; and
said buffer program means having further means for enabling said digital processor to examine said channel adapted terminated transfer for adjusting said end address register contents to the last address for indicating termination of said processing task upon reading a last one of said end-address-identified data storage registers.

4. The method of operating a random access data storage unit having a plurality of addressable data storage registers, said random access unit being coupled to a digital processor for operating therewith with respect to execution of predetermined processing tasks and having data means for transferring data with other means connected to said random access unit;

the improvement, including the steps of:
initiating a data transfer with said other means into said random access unit and maintaining an indication of the data storage registers receiving said data;
operating said digital processor to identify said data storage registers that have received said data and indicating such data storage registers by an end address;
performing said processing task with respect to said identified data storage registers while simultaneously operating said other means to transfer data signals into ones of said data storage registers of said random access unit other than said identified data storage registers;
when said digital processor has completed a processing task with respect to the data stored in said identified data storage registers, identifying a second set of said ones of said addressable data storage registers which store data received from said other means during said processing and identifying all of said second identified data storage registers for processing according to said processing task; and repeating the above-recited steps until all data has been received from said other means and then terminating said processing upon completion of processing the data in a last one of a last-identified set of said data storage registers.

5. The method set forth in claim 4, wherein said other means supplies data to said random access unit at a rate higher than said digital processor processes the data; further, including the steps of:

limiting the size of data storable in said random access unit to a predetermined number of bytes of said data and performing the steps set forth in claim 4 until said predetermined number has been reached and then terminating the processing by said digital processor; and determining said predetermined number by a fixed threshold or in the alternative by selecting a number less than said fixed threshold.

* * * * *